US011055576B2

(12) United States Patent
Anderson et al.

(10) Patent No.: US 11,055,576 B2
(45) Date of Patent: Jul. 6, 2021

(54) SYSTEM AND METHOD FOR SYSTEM-AWARE CLASSIFIERS

(71) Applicants: Toyota Research Institute, Inc., Los Altos, CA (US); The Regents of The University of Michigan, Ann Arbor, MI (US)

(72) Inventors: Michael Robert Anderson, Northville, MI (US); Thomas Friedrich Wenisch, Ann Arbor, MI (US); German Ros Sanchez, San Francisco, CA (US)

(73) Assignees: Toyota Research Institute, Inc., Los Altos, CA (US); The Regents of The University of Michigan, Ann Arbor, MI (US)

( * ) Notice: Subject to any disclaimer, the term of this patent is extended or adjusted under 35 U.S.C. 154(b) by 505 days.

(21) Appl. No.: 15/958,184

(22) Filed: Apr. 20, 2018

(65) Prior Publication Data

US 2019/0130223 A1 May 2, 2019

Related U.S. Application Data

(60) Provisional application No. 62/580,204, filed on Nov. 1, 2017.

(51) Int. Cl.
*G06K 9/62* (2006.01)
*G06F 17/30* (2006.01)
(Continued)

(52) U.S. Cl.
CPC ....... *G06K 9/6267* (2013.01); *G06F 16/5838* (2019.01); *G06K 9/6257* (2013.01); *G06N 3/04* (2013.01)

(58) Field of Classification Search
CPC ........... G06F 16/5838; G06K 9/00624; G06K 9/6227; G06K 9/6257; G06K 9/6267;
(Continued)

(56) References Cited

U.S. PATENT DOCUMENTS 8,433,669 B2 4/2013 Amini et al.
9,235,769 B2 1/2016 Oro Garcia et al.
(Continued)

OTHER PUBLICATIONS

T. Machida and T. Naito, "GPU & CPU cooperative accelerated pedestrian and vehicle detection," 2011 IEEE International Conference on Computer Vision Workshops (ICCV Workshops), Barcelona, 2011, pp. 506-513, doi: 10.1109/ICCVW.2011.6130285. (Year: 2011).*

(Continued)

*Primary Examiner* — Michael J Vanchy, Jr.
(74) *Attorney, Agent, or Firm* — Christopher G. Darrow; Darrow Mustafa PC

(57) ABSTRACT

System, methods, and other embodiments described herein relate to improving querying of a visual dataset of images through implementing system-aware cascades. In one embodiment, a method includes enumerating a set of cascade classifiers that are each separately comprised of transformation modules and machine learning modules arranged in multiple pairs. Classifiers of the set of cascade classifiers are configured to extract content from an image according to a query. The method includes selecting a query classifier from the set of cascade classifiers based, at least in part, on system costs that characterize computational resources consumed by the classifiers of the set of cascade classifiers. The computational resources include at least data handling costs. The method includes identifying content within the image using the query classifier.

20 Claims, 6 Drawing Sheets

(51) Int. Cl.
 *G06N 3/04* (2006.01)
 *G06F 16/583* (2019.01)
(58) Field of Classification Search
 CPC .... G06K 9/627; G06K 9/6282; G06K 9/6292; G06N 3/04; G06N 3/0445; G06N 3/0454; G06N 3/0481; G06N 3/08; G06N 5/003
 See application file for complete search history.

(56) References Cited

U.S. PATENT DOCUMENTS

| | | | | |
|---|---|---|---|---|
| 2006/0018521 | A1* | 1/2006 | Avidan | G06K 9/4609 382/118 |
| 2007/0112701 | A1 | 5/2007 | Chellapilla et al. | |
| 2010/0166339 | A1 | 7/2010 | Gokturk et al. | |
| 2017/0124409 | A1* | 5/2017 | Choi | G06N 3/0454 |

OTHER PUBLICATIONS

Engen, J. Vincent, A. C. Schierzand K. Phalp, "Multi-objective evolution of the Pareto optimal set of neural network classifier ensembles," 2009 International Conference on Machine Learning and Cybernetics, Hebei, 2009, pp. 74-79, doi: 10.1109/ICMLC.2009.5212485. (Year: 2009).*
Abadi et al. TensorFlow: Large-Scale Machine Learning on Heterogeneous Systems. (2015). https://www.tensorflow.org/ Software available from tensorflow.org.
Anderson et al. Brainwash: A Data System for Feature Engineering, in Conference on Innovative Data Systems Research (CIDR) (2013).
Anderson et al. Input selection for fast feature engineering, in 2016 IEEE 32nd International Conference on Data Engineering (ICDE) (2016).
Bailis et al. Macrobase: Prioritizing attention in fast data, in SIGMOD (2017).
Bucilu et al., Model compression, in Twelfth ACM SIGKDD International Conference on Knowledge Discovery and Data Mining (2006).
Cai et al. Learning complexity-aware cascades for deep pedestrian detection, in ICCV (2015).
Chen et al., Classifier cascade for minimizing feature evaluation cost. In Artificial Intelligence and Statistics. 218-226.
Chollet et al. 2015. Keras, accessed at: https://web.archive.org/web/20150522055317/https://github.com/fchollet/keras.
Crankshaw, et al. The missing piece in complex analytics: Low latency, scalable model management and serving with velox. arXiv preprint arXiv:1409.3809 (2014).
Fagin, Fuzzy queries in multimedia database systems, ACM SIGACT-SIGMOD-SIGART Symposium on Principles of Database Systems (1998).
Feng et al., Towards a unified architecture for in-RDBMS analytics. In Proceedings of the 2012 ACM SIGMOD International Conference on Management of Data. ACM, 325-336.
Flickner, et al., Query by image and video content: The QBIC system. Computer 28, 9 (1995), 23-32.
Golshani et al. A language for content-based video retrieval. Multimedia Tools and Applications 6, 3 (1998), 289-312.
Viola et al., Robust real-time face detection. International Journal of Computer Vision 57, 2 (2004), 137-154.
Guyon et al. An introduction to variable and feature selection. Journal of machine learning research 3, Mar. (2003), 1157-1182.
Kaiming, et al., Deep residual learning for image recognition. arXiv:1512.03385v1 [cs.CV] Dec. 10, 2015.
Hinton et al. Distilling the knowledge in a neural network. In NIPS Deep Learning Workshop (2014).
Hu, et al. Squeeze-and-Excitation Networks. arXivpreprint arXiv:1709.01507 (2017).
Hu et al., A survey on visual content-based video indexing and retrieval. IEEE Trans. on Systems, Man, and Cybernetics, Part C (Applications and Reviews) 41, 6 (2011), 797-819.
Ioffe et al., Batch normalization: Accelerating deep network training by reducing internal covariate shift. In ICML. arXiv:1502.03167v3 [cs.LG] Mar. 2, 2015.
Kang et al., NoScope: Optimizing Neural Network Queries Over Video at Scale, accessible through the link: arXiv:1703.02529v3 [cs.DB], Aug. 8, 2017, Proceedings of the VLDB Endowment 10, 11, 1586-1597.
Koprulu, et al, Spatio-temporal querying in video databases. Information Sciences 160, 1 (2004), 131-152.
Kossmann et al., Shooting stars in the sky: An online algorithm for skyline queries. In Proceedings of the 28th International conference on Very Large Data Bases. VLDB Endowment, 275-286. (2002).
Kraska, MLbase: A Distributed Machine-learning System, in CIDR, vol. 1.2-1 (2013).
Krizhevsky, et al. Imagenet classification with deep convolutional neural networks. In Advances in neural information processing systems, pp. 1097-1105, 2012.(2012).
Kumar et al., Model selection management systems: The next frontier of advanced analytics. ACM SIGMOD Record 44, 4 (2016), 17-22.
Kung et al. On finding the maxima of a set of vectors. Journal of the ACM (JACM) 22, 4 (1975), 469-476.
Kuo et al., A content-based query language for video databases. In Multimedia Computing and Systems (1996).
Li et al., MOQL: A multimedia object query language. In Intl. Workshop on Multimedia Info. Systems (1997).
Liu et al., SSD: Single Shot MultiBox Detector, arXiv:1512.02325v5 [cs.CV] Dec. 29, 2016.
Papadimitriou et al., Multiobjective Query Optimization, in Proceedings of the Twentieth ACM SIGMOD-SIGACT-SIGART Symposium on Principles of Database Systems (PODS '01). (2001).
Zhang et al., Materialization optimizations for feature selection workloads. ACM Transactions on Database Systems (TODS) 41, 1 (2016).
Petkovic et al., A framework for video modelling, in Intl. Conf. on Applied Informatics (2000).
Redmon et al., You only look once: Unified, real-time object detection. In CVPR., arXiv:1506.02640v5 [cs.CV] May 9, 2016.
Redmon et al., YOLO9000: Better, Faster, Stronger, accessible through the link: arXiv:1612.08242v1 [cs.CV], Dec. 25, 2016.
Ren et al., State-of-the art on spatio-temporal information-based video retrieval. Pattern Recognition, vol. 42, Issue 2, Feb. 2009, pp. 267-282.
Russakovsky et al., ImageNet Large Scale Visual Recognition Challenge, International Journal of Computer Vision, arXiv:1409.0575v3 [cs.CV] Jan. 30, 2015.
Seide, et al., Feature engineering in context-dependent deep neural networks for conversational speech transcription. In ASRU Workshop (2011).
Severyn et al., Automatic Feature Engineering for Answer Selection and Extraction. In Proceedings of the 2013 Conference on Empirical Methods in Natural Language Processing, pp. 458-467.
Aguierre Smith et al., The stratification system a design environment for random access video, in International Workshop on Network and Operating System Support for Digital Audio and Video (1992).
Snoek et al., Concept-based video retrieval. Foundations and Trends in Information Retrieval 2, 4 (2008), 215-322 (2008).
Sun et al., Deep convolutional network cascade for facial point detection. In CVPR (2013).
Szegedy et al., Inception-v4, Inception-ResNet and the Impact of Residual Connections on Learning. In ICLR 2016 Workshop, arXiv:1602.07261v2 [cs.CV] Aug. 23, 2016.
Verschae et al., A unified learning framework for object detection and classification using nested cascades of boosted classifiers. Machine Vision and Applications 19, 2 (2008), 85-103.

* cited by examiner

SYSTEM AND METHOD FOR SYSTEM-AWARE CLASSIFIERS

CROSS-REFERENCE TO RELATED APPLICATIONS

This application claims benefit of U.S. Provisional Application No. 62/580,204, filed on, Nov. 1, 2017, which is herein incorporated by reference in its entirety.

TECHNICAL FIELD

The subject matter described herein relates in general to systems and methods for implementing cascade classifiers to extract information from non-textual datasets and, more particularly, to selecting and implementing a cascade classifier that is optimized according to at least costs associated with data handling for a particular computing system.

BACKGROUND

Machine perception and understanding of electronic information can represent a difficult task. For example, robots generally use electronic sensors such as cameras, LiDAR, and other sensors to acquire information about a surrounding environment. The information can take different forms such as still images, video, point clouds, and so on. However, understanding the contents of the information, especially when presented in a non-textual format can be a complex task. By way of example, the robots generally process the information in order to provide for making determinations about the presence of obstacles, navigation paths, and so on. While present approaches for understanding the perceived information are capable of distinguishing between aspects of the information with reasonable accuracy, this accuracy is achieved at the expense of high computational resources that represent significant difficulties when attempting to achieve recognition of the information in real-time.

Moreover, further applications such as identifying information through querying images/video, and other non-textual data sources generally employ similarly expensive content extraction approaches. As a result, querying visual datasets and/or recognizing aspects within sensor data (e.g., images) generally suffers from extended runtimes Thus, executing a query over a large visual dataset such as a video library or within a stream of video images can be computationally prohibitive.

Additionally, approaches that attempt to resolve the noted difficulties may implement hierarchical models, such as cascades of multiple neural networks, with some queries being serviced by inexpensive, simple classifiers in the cascade whereas more complex and computationally intensive classifiers handle the difficult cases. While cascades can improve upon previous approaches, the computational resources and associated runtimes are generally still prohibitive for performing the noted functions especially in regards to queries over large databases of videos or for performing tasks in real-time.

SUMMARY

In one embodiment, example systems and methods relate to a manner of implementing cost-aware cascade classifiers. As noted, extracting content from non-textual information such as images represents a complex task. Present approaches generally suffer from extended run times due to the computationally intensive nature of the task. This is especially true when executing textual queries over large datasets of non-textual data such as video libraries and the like.

Moreover, optimizing cascade classifiers can present further complexities. For example, each separate implementation of a cascade classifier can include tradeoffs between accuracy and computational requirements in relation to architectures of the separate machine learning algorithms included therein. As an additional aspect, some cascade classifiers pair machine learning algorithms with pre-processing functions as a manner of improving accuracy. However, the pre-processing functions add further computational requirements to the overall processing and, therefore, can influence an ability of the classifier to function efficiently.

In either case, the cascade classifiers consume computational resources not only in relation to executing the machine learning and transformation algorithms, but also in relation to data handling (e.g., loading images from a data store to be processed). As a further matter, each individual system that implements the cascade has unique characteristics associated with how data is handled therein. For example, depending on a particular configuration of a computing system data may be loaded from a local data store, a cloud-based data store, a remote data warehouse, and so on.

The particular computing system associated therewith may have different data bus bandwidths, processing capabilities, and other distinct system characteristics. As such, the particular configuration of the computing system itself can have an effect on the overall efficiency of a given cascade classifier because of differences in loading times and general computing abilities. However, many systems do not consider the system costs associated with executing the cascade classifier and handling data processed by the cascade classifier when selecting a particular classifier to implement. Consequently, an implemented classifier may not function optimally because the system costs of the particular computing system are not considered.

Therefore, in one embodiment, a system assesses a set of cascade classifiers according to system costs associated with implementing the classifiers within a particular computing system. For example, the system can generate the set of cascade classifiers to include a range of different internal architectures, different combinations of classifier pairs (i.e., pairs of machine learning and transformation algorithms), different numbers of pairs, and so on. After generating the set of classifiers, the system can test the classifiers according to particular constraints of the computing system on which one or more of the classifiers is to be implemented. Thus, the system can determine execution times, data handling costs, and/or other aspects of how the classifiers execute to quantify the system costs in relation to the operation of the cascade classifiers on the particular computing system.

Subsequently, the system can identify a subset of the classifiers that, for example, represent the most efficient classifiers according to a range of accuracies. As such, the system selects between the classifiers of the subset to identify and provide a query classifier. The query classifier is a member of the subset that functions optimally according to an awareness of execution and data handling costs for the particular computing system. Thus, the system executes queries over a visual dataset or other non-textual dataset using the query classifier on the computing system to acquire content therefrom. In one or more aspects, the system can select the query classifier from the subset according to specified constraints such as a required execution time or a specified accuracy. In this way, the system implements cost-aware cascade classifiers that improve operating efficiencies over other approaches.

In one embodiment, a classifier system for improving querying of a visual dataset of images through implementing system-aware cascades is disclosed. The classifier system includes one or more processors and a memory communicably coupled to the one or more processors. The memory storing a cascade module including instructions that when executed by the one or more processors cause the one or more processors to enumerate a set of cascade classifiers that are each separately comprised of transformation modules and machine learning modules arranged in multiple pairs. The classifiers of the set of cascade classifiers are configured to extract content from an image according to a query. The memory storing a query module including instructions that when executed by the one or more processors cause the one or more processors to select a query classifier from the set of cascade classifiers based, at least in part, on system costs that characterize computational resources consumed by the classifiers of the set of cascade classifiers. The computational resources include at least data handling costs. The query module includes instructions to identify content within the image using the query classifier.

In one embodiment, a non-transitory computer-readable medium for improving querying of a visual dataset of images through implementing system-aware cascades is disclosed. The non-transitory computer-readable medium including instructions that when executed by one or more processors cause the one or more processors to perform various functions. The instructions include instructions to generate projected controls to enumerate a set of cascade classifiers that are each separately comprised of transformation modules and machine learning modules arranged in multiple pairs. The classifiers of the set of cascade classifiers are configured to extract content from an image according to a query. The instructions include instructions to select a query classifier from the set of cascade classifiers based, at least in part, on system costs that characterize computational resources consumed by the classifiers of the set of cascade classifiers. The computational resources include at least data handling costs. The instructions include instructions to identify content within the image using the query classifier.

In one embodiment, a method of improving querying of a visual dataset of images through implementing system-aware cascades is disclosed. In one embodiment, the method includes enumerating a set of cascade classifiers that are each separately comprised of transformation modules and machine learning modules arranged in multiple pairs. Classifiers of the set of cascade classifiers are configured to extract content from an image according to a query. The method includes selecting a query classifier from the set of cascade classifiers based, at least in part, on system costs that characterize computational resources consumed by the classifiers of the set of cascade classifiers. The computational resources include at least data handling costs. The method includes identifying content within the image using the query classifier.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
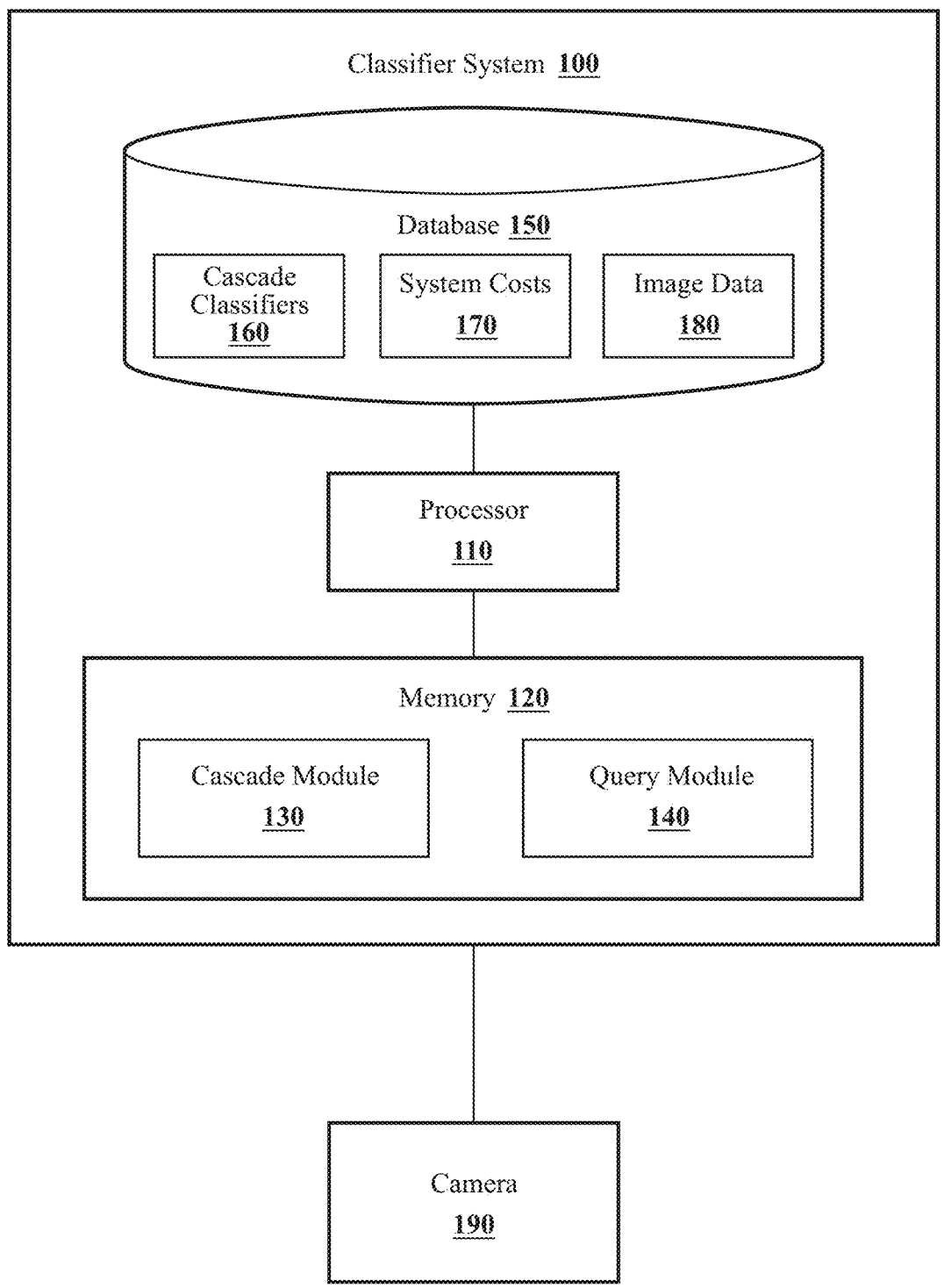
FIG. 1 illustrates one embodiment of a classifier system that is associated with generating a cost-aware cascade classifier.

Systems, methods, and other embodiments associated with implementing cost-aware cascade classifiers are disclosed. As mentioned previously, extracting information from non-textual data can be a computationally intensive task. Moreover, present approaches generally suffer from extended run times due to the complex nature of the task being undertaken but also because the particular implementation may be ill-suited for executing on the particular computing system. Because aspects of the computing system such as data bandwidth, processing abilities, and other characteristics can have an effect on the overall execution of a given cascade classifier, particularly in relation to how different configurations of classifiers may function on the computing system, a classifier that is implemented without consideration of the system costs may not function optimally.

Therefore, in one embodiment, a classifier system generates and assesses a plurality of cascade classifiers against characteristics of a particular computing system in order to determine which of the cascade classifiers function optimally on the computing system. In this way, the classifier system can provide one or more cascade classifiers for implementation on the computing system that provide optimal runtimes within processing and data handling constraints of the computing system.

For example, the classifier system is configured to generate the set of classifiers by varying internal architectures through a number and configuration of layers within machine learning algorithms at each layer of the classifier, by pairing the different architectures of the machine learning algorithms with different transformation algorithms that perform pre-processing on input data (e.g., images), by varying a number of layers of classifier pairs in different cascades, and so on. Accordingly, the classifier system generates the set to include many possible cascade classifiers that individually have separate characteristics which correspond to variations in how the individual classifiers execute and, thus, execute optimally on different computing systems with different configurations.

Consequently, the classifier system evaluates the set of cascade classifiers according to constraints of the computing system that is to execute the cascade classifier. From this evaluation, the classifier system generates estimated system costs and information about the accuracy associated with the cascade classifiers. Accordingly, a subset of the cascade classifiers is then provided that represent optimal classifiers for different run times and different accuracy constraints. The classifier system can then select one of the cascades from the subset to implement according to specified constraints for a particular query or implementation.

Subsequently, the system executes queries over a visual dataset or other non-textual dataset on the computing system to extract and acquire content therefrom according to the query. In this way, the classifier system implements cost/system-aware cascade classifiers that improve operating efficiencies over other approaches.

Referring to FIG. 1, one embodiment of a classifier system 100 that is implemented to perform methods and other functions as disclosed herein relating to generating and implementing cascade classifiers is illustrated. It should be appreciated, that while the classifier system 100 is illustrated as being a single contained system, in various embodiments, the classifier system 100 is a distributed system that is comprised of components that can be provided as a centralized server, a cloud-based service, and so on. The noted functions and methods will become more apparent with a further discussion of the figures.

As an additional note, while the classifier system 100 is generally applicable to many different contexts within which a cascade classifier of machine learning algorithms may be implemented, in one or more embodiments, the classifier system 100 is implemented to at least support functions of an autonomous driving module that provides autonomous driving (i.e., self-driving) functionality to a vehicle. The autonomous driving module, in one embodiment, is comprised of a plurality of sub-modules that each perform a respective task in relation to autonomously operating the vehicle. That is, the autonomous driving module includes sub-modules that, in combination, determine travel path(s), current autonomous driving maneuvers for the vehicle 600, future autonomous driving maneuvers and/or modifications to current autonomous driving maneuvers. The autonomous driving module performs the noted actions based, at least in part, on data acquired by electronic sensors, and/or data from other suitable sources. Accordingly, the classifier system 100, in one embodiment, provides one or more of the sub-modules or components thereof in the form of a cascade classifier.

With further reference to FIG. 1, the classifier system 100 is shown as including a processor 110. Accordingly, the processor 110 may represent a distributed processing resource, an individual local processor (e.g., a CPU, GPU, or application specific processor), or the classifier system 100 may access the processor 110 through a data bus or another communication path. In one embodiment, the classifier system 100 includes a memory 120 that stores a cascade module 130 and a query module 140. The memory 120 is a random-access memory (RAM), read-only memory (ROM), a hard-disk drive, a flash memory, a processor cache, or other suitable memory for storing the modules 130 and 140. The modules 130 and 140 are, for example, computer-readable instructions that when executed by the processor 110 cause the processor 110 to perform the various functions disclosed herein.

Moreover, it should be appreciated that, in various embodiments, one or more aspects of the classifier system 100 are implemented as cloud-based services (e.g., software as a service), centralized OEM services, and so on. Thus, one or more aspects of the classifier system 100 are, in one embodiment, implemented in a distributed manner in a cloud-computing environment. Additionally, the classifier system 100, in one or more aspects, includes a database 150 that is stored in a separate data store, in the memory 120, or in another suitable configuration. Further aspects of the database 150 will be discussed subsequently.

In either case, in one embodiment, the cascade module 130 generally includes instructions that function to control the processor 110 to enumerate a set of cascade classifiers 160. In general, the cascade module 130 enumerates the cascade classifiers 160 by electronically storing the cascade classifiers in, for example, the database 150 and generating a listing or index of the cascade classifiers 160 for subsequent reference and retrieval.

The cascade module 130 may also generate the set of cascade classifiers 160 prior to the enumerating. In general, the cascade classifiers include multiple classifier pairs. The separate classifier pairs are comprised of, in one embodiment, a transformation module, and a machine learning module. The transformation module is, for example, comprised of a pre-processing algorithm such as an image filter that performs resizing, normalizing, color adjustments, and so on. As a general approach, the transformation module can include any pre-processing algorithm or combination of algorithms that transform the input data in a meaningful manner so as to support the functioning of the machine learning module.

The machine learning module includes, in one embodiment, a machine learning algorithm such as a convolutional neural network (CNN) or other suitable deep learning algorithm. As discussed herein, the classifier system 100 functions to generate cascade classifiers that extract information from image data and, thus, the machine learning algorithms discussed in relation to the machine learning modules are generally those algorithms that are known for extracting information from images. However, in further aspects, the machine learning algorithms implemented by the classifier system 100 may differ in relation to a type of data that is to be analyzed. For example, when the data that is to be analyzed is comprised of point cloud data produced by a LiDAR sensor, the machine learning algorithm(s) implemented by the machine learning module may include a different type of CNN, or another suitable deep learning algorithm. Additionally, when the data includes time-sensitive aspects, the machine learning algorithm(s) implemented by the classifier system 100 can include recurrent neural networks (RNN), and so on. Moreover, the machine learning algorithm itself within each of the machine learning modules may be comprised of more than one such algorithm (e.g., a combination of two or more neural networks) in one or more embodiments.

Accordingly, the cascade module 130 pairs the machine learning modules with the transformation modules to generate a plurality of classifier pairs that are comprised of different combinations of the two components. That is, while the machine learning modules may include a convolutional neural network (CNN), the cascade module 130 generally varies an internal architecture of the CNN such that there are many different versions or iterations of the CNN. For example, the cascade module 130 can vary a number of layers within the CNN to provide many variations of the CNN having different characteristics in regards to run times and accuracies of outputs. Similarly, the transformation modules can include various forms of the transformation algorithms that provide for different extents of filtering/pre-processing. Thus, the different transformation modules are also associated with different characteristics in relation to run times and how well accuracies are improved of an associated machine learning module.

In either case, the cascade module 130 generates the classifier pairs by combining the different machine learning modules with the transformation modules in order to provide a plurality of different classifier pairs with differing characteristics. The cascade module 130, in one embodiment, combines the separate modules according to a cross product between the modules such that the plurality of classifier pairs represents all possible combinations thereof. In a similar manner, the cascade module 230 combines the classifier pairs into cascades to generate the set of cascades 160 such that the set of cascade classifiers 160 includes different combinations of the classifier pairs.

In general, the cascades within the set 160 each include at least two of the classifier pairs arranged in a cascade configuration. Thus, the set 160 can include cascades with two, three, four, or more levels of the classifier pairs. While the set 160 is discussed as including cascades with differing numbers of levels, as discussed herein, the cascades of the set 160 generally include three levels or tiers of classifiers. Moreover, the general configuration of the tiers within a given cascade of the set 160 is such that simpler cascades (e.g., reduced runtime) occur first followed by successively more complex classifiers. Thus, with each tier within a cascade, runtimes and thus computational resources consumed by the cascade can increase. As an additional aspect, determinations of whether processing a query proceeds to a successive tier in a cascade is generally determined according to a decision threshold.

Thus, each tier includes a selected decision threshold that determines whether a result output for a particular tier is adequate to provide as a final determination or whether processing should continue. While discussed further subsequently, selection of the threshold can influence accuracy outcomes and also computational resources consumed by a particular cascade. As one example, a classifier pair within a cascade that is configured with a relatively high decision threshold passes more queries onto subsequent tiers than a cascade with a relatively lower decision threshold. In either case, the decision thresholds are selected according to architectures of the specific classifiers.

As an additional note, in one embodiment, the classifier system 100 includes a database 150 as a means of storing various data elements. The database 150 is, in one embodiment, an electronic data structure stored in the memory 120 or a separate electronic data store and that is configured with routines that can be executed by the processor 110 for analyzing stored data, providing stored data, organizing stored data, and so on. Thus, in one embodiment, the database 150 stores data used by the modules 130 and 140 in executing various functions. In one embodiment, the database 150 includes the cascade classifiers 160, the system costs 170, the image data 180, and/or other information that is used by the modules 130 and/or 140.

Once the cascade module 130 populates the set of cascade classifiers 160 with the classifier pairs, the cascade module 130 can evaluate the separate cascades to determine associated system costs 170. For example, in one approach, the cascade module 130 acquires via an electronic input (e.g., electronic communication) information about a computing system on which one or more of the cascade classifiers 160 is to be implemented. The information can include, for example, attributes of the computing system and/or aspects relating to the computing system. For example, the attributes from which the cascade module 130 derives the system costs 170 can include throughput of a data pipeline (e.g., aspects related to loading images from a data store), processing capabilities of the computing system (e.g., processor type, memory configurations, cache configurations, etc.), and other aspects relating to the computing system that affect how a cascade classifier processes an image to produce output.

Furthermore, the cascade module 130, in one embodiment, computes the system costs 170 according to at least data handling costs associated with loading the data being analyzed (i.e., images) when executing a query, and execution costs associated with processing the data/image once loaded. As a further manner of illustrating the system costs 170, the cascade module 130 can compute three separate costs. The separate costs include, in one approach, loading costs, transform costs, and inference costs. The loading costs are, for example, costs (i.e., computational time) for loading the data that is to be processed such as images from a location where the images are stored. Thus, the loading costs can quantify loading times for acquiring images from a local disk drive, a local volatile memory (e.g., RAM) or non-volatile memory (e.g., Flash memory), a remote data store (e.g., data store located across a communications network), and so on.

In one or more approaches, the transform costs are included as part of the data handling costs. In either case, the transform costs include computational time for pre-processing input data (e.g., images). The transform cost is generally directly related to the transformation algorithms implemented within the respective classifier pairs. Thus, the transform costs include costs for decoding video into images, adjusting image resolution, adjusting color representations in images, or performing any other transforms as may be implemented within the transformation modules to prepare the input data for processing by the machine learning modules.

The cascade module 130 generally evaluates the cascades within the set of cascade classifiers 160 according to the noted system costs 170 by, in one embodiment, separately executing the cascade classifiers within the set 160 within a test environment that mimics the defined computing system on which a cascade classifier is to be implemented. In one embodiment, the cascade module 130 executes the classifiers 160 using an evaluation set of images within the test environment to produce the associated system costs 170. Accordingly, the system costs 170 represent costs averaged over a plurality of images contained within the evaluation set and therefore reasonably correlate to what may be expected when implemented within the actual computing system.

In this way, the cascade module 130 can approximate system costs 170 associated with each of the cascade classifiers 160 to assess the classifiers 160 and determine which may operate optimally according to constraints of the defined computing system. Moreover, it should be appreciated that while the primary focus herein is on determining the system costs 170; the cascade module 130 also assesses the accuracy of the cascade classifiers 160 using the evaluation data set. For example, because the identity of content of the evaluation images is known since the evaluation set is generally labeled, the cascade module 130 can determine a correspondence of results with actual content included with the images. Thus, in addition to the system costs 170, the cascade module 130 generates accuracy metrics for the cascade classifiers 160 in order to assess how well each of the cascade classifiers 160 performs. It should be noted that, in one embodiment, the components (e.g., transformation modules and machine learning modules) of the cascade classifiers 160 are independently evaluated within the test environment and results of which are combined with corresponding portions of the cascade to produce the system costs. This approach can efficiently determine the system costs and accuracies.

Figure 2:
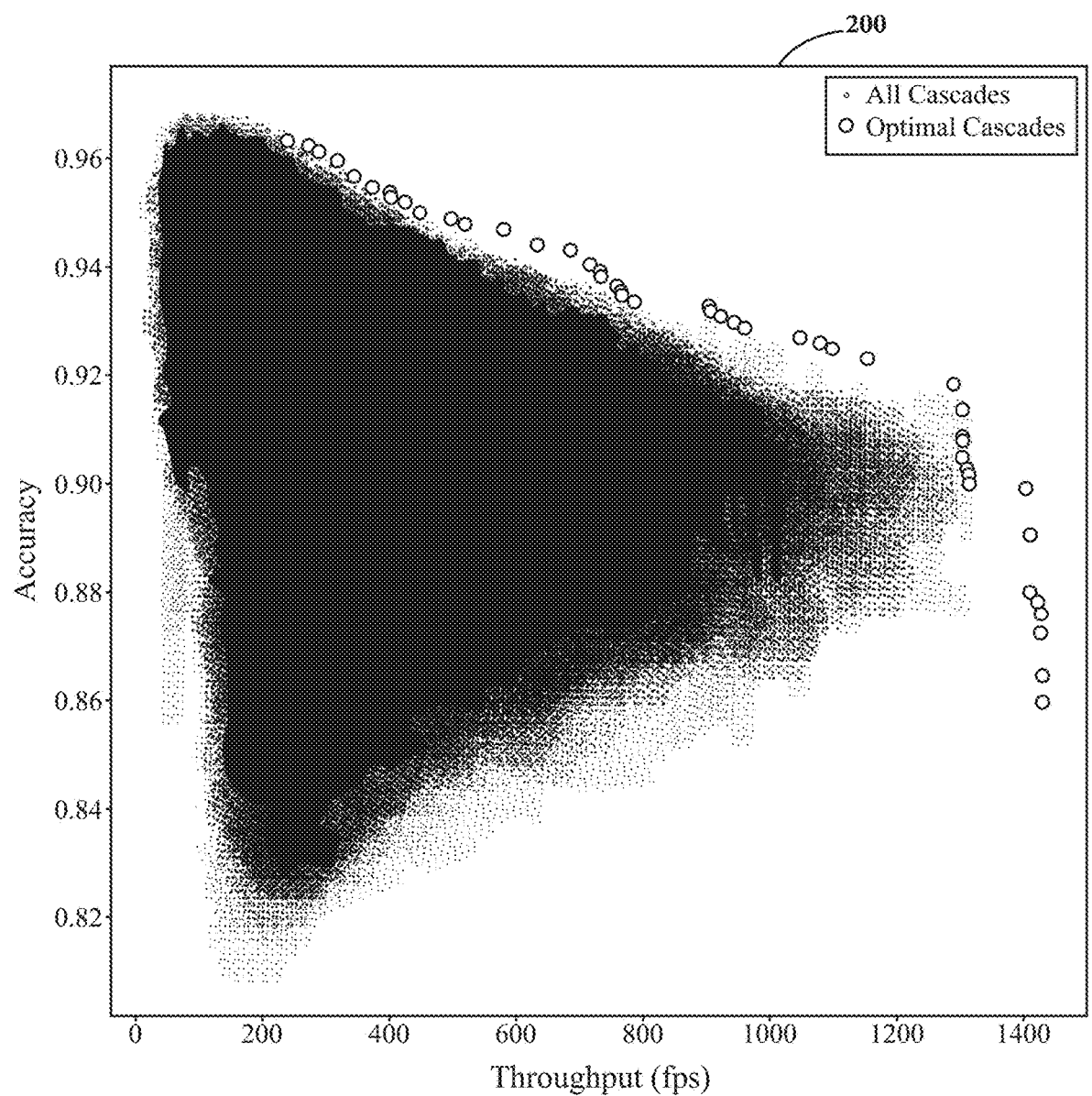
FIG. 2 is an example graph illustrating accuracy and throughput characteristics of the set of cascade classifiers as assessed over a set of constraints.

By way of example, FIG. 2 illustrates a graph 200 of the system costs 170 in the form of throughput in frames per second (e.g., images per second processed by a cascade classifier) in comparison to accuracy as a percent of correct identifications (i.e., 1=100%). As shown in the graph 200, the cascade classifiers 160 generally range from 0.8 accuracy to 0.97 or better with throughputs (i.e., system costs) ranging from 75 images per second to upwards of 1400 images per second. The optimal cascades are illustrated using circles whereas other ones of the cascade classifiers are represented using standard plotted dots. The optimal cascades (otherwise referred to as Pareto optimal or as being on the Pareto frontier) are cascades that represent the best tradeoffs between accuracy and throughput for the constraints of the defined computing system. A cascade is defined as being an optimal cascade that dominates other cascades, in one embodiment, if the particular cascade has greater-than or equal values for all attributes, and strictly greater values for at least one attribute. The cascades identified as optimal reside along a Pareto frontier are cascades that are not dominated by other cascades in the set 160.

In one embodiment, the cascade module 130 identifies the Pareto frontier cascades as the optimal cascades for the computing system and selects the optimal cascades as a subset of the cascade classifiers 160. The cascade module 130 can then provide the optimal cascades to be implemented on the computing system or can implement the optimal cascades directly. Moreover, the cascade module 130, in one approach, provides one of the cascades of the subset instead of multiple cascades. Accordingly, the cascade module 130 may acquire further electronic inputs specifying desired characteristics from which the cascade module 130 chooses a query classifier from the subset that is implemented.

In a further approach, the query module 140 selects the query classifier from the subset on a per query, per session, or another basis such that the query classifier can vary over the subset of optimal classifiers. In one embodiment, the query module 140 selects the query classifier according to at least an electronic input that specifies system constraints such as a desired accuracy and/or runtime. The electronic input can define the desired runtime specifically or in a relative manner according to other cascades in the subset (e.g., low, medium, high). In either case, the computing system implements at least one cascade of the subset to perform analysis of a set of data. While the classifier system 100 may be implemented for many different purposes, in general, the classifier system 100 can be used in relation to the analysis of visual datasets (e.g., video and images) that include a large amount of data. In further aspects, the classifier system 100 is implemented to provide cascade classifiers for autonomous driving functions. In either case, the classifier system 100 improves over previous approaches by, for example, generating cascade classifiers with a myriad of different operating characteristics and providing one or more of the cascade classifiers according to system costs that account for data handling in addition to other computational costs.

The following provides a brief reference of various notations for defining aspects of the present system and methods that will be used subsequently to further describe how the cascade module 130 generates the set of cascade classifiers 160. $I=(I_1, \ldots, I_n)$ represent an image data corpus (e.g., image data 180). $T_i=(t_{i1}, \ldots, t_{im})$ represents a content tuple for image $I_i$. K represents an image classifier, such that $K(I_i)=t_{ij}$. $M=(M_1, \ldots, M_m)$ represents base classification models (e.g., machine learning modules). $A=(A_1, \ldots, A_{n_a})$ represents architecture specifications for varying classification models. $F=(F_1, \ldots, F_{nf})$ represents input transformation algorithms included as transformation modules. $C=(M_1, \ldots, M_n)$ represents a cascade of n models belonging to M. $S=(C_1, \ldots, C_k)$ represents a collection of cascades for a binary query. $p_{low}$, $p_{high}$ represent Cascade model decision thresholds.

As an initial matter, as used herein, a query generally refers to a content-based query of non-textual data such as images, video, and the like and not of textual metadata associated with images and video or a plain textual database or dataset. Accordingly, given a set of image data including images $I_1, \ldots, I_n$, the tuples $Ti=(t_{i1}, \ldots, t_{im})$ represent the visual contents for each image $I_i$, where each element $t_{ij}$ in the tuple represents a content object present in image $I_i$. A content-based query is constructed of predicates that can be evaluated with the elements of $T_i$.

In general, the content queries can be, for example, binary queries. Accordingly, given a content tuple $T_i$, for an image, a binary query is one that involves a single 'contains-object' predicate evaluated with a single tuple element, $t_{ij}$. Such a query inquires about whether image $I_i$ includes object $t_{ij}$.

Because the content of images are generally not available upon acquisition of the image, an image classifier (i.e., the machine learning module) executes in response to a query to extract content from images and determine the presence of queried tuples. Thus, given a corpus of image data I, for each image $I_i \in I$, a given cascade classifier generates a binary label L using a classifier K, such that $L_i=K(I_i)$. The label $L_i$ corresponds to a member $t_{ij}$ of content tuple $T_i$. Furthermore, a basic model M (i.e., machine learning module) implements a statistical classification that accepts image I as input and outputs a binary classification result. The system 100 generates a large set of such models $M=(M_1, \ldots, M_m)$ using, for example, a CNN-style architecture. In one embodiment, the system 100 parameterizes a model $M_m$ using two factors: a model architecture specification $A_m$ an input transformation function $F_m$.

The internal architecture of a model $M_m$ is specified by $A_m$. In the case of CNNs implemented by the system 100, $A_m$ describes typical hyper-parameters, such as a number and a size of layers within the model $M_m$. $A=(A_1, \ldots, A_{nA})$ gives all such descriptions for models in M. Prior to classifying an image I by model $M_m$, the raw image data is processed by an image transformation function $F_m$, which may perform one or more operations such as resizing, normalizing, reducing color depth, and so on. The set $F=(F_1, \ldots, F_{nf})$ gives all such functions available to pre-process image data for models in M.

Accordingly, the classifier system 100 uses the cross product of the set of transformation functions F with the set of architecture descriptions A as a basis for generating models in M. As a result of this, the system 100 generates, for example, several hundred individual models and subsequently determines which of the models are most suitable given specified accuracy and runtime constraints within a defined computing system. Consequently, a classifier cascade $C=(M1, \ldots, Mn)$ is a collection of n basic models with probabilistically interpretable output ok, such that $0<o_k<1$. In one embodiment, the system 100 runs the models in series: an input image $I_i$ is classified by $m_k$, and if the output is between two given decision thresholds, $p_{low}$ and $p_{high}$, it is uncertain. In such a case, $I_i$ is then classified by $M_{k+1}$. Otherwise, the output of $M_k$ is accepted as the label of $I_i$. This continues until the final classifier $M_n$ is reached, the output of which is accepted.

Given a set of classification models M that are parameterized by the cross product of architecture specifications A and input transformation functions F, the classifier system 100 can generate a large set of cascades $C=(C_1, \ldots, C_k)$ with up to n levels each, to be evaluated in terms of accuracy and throughput. The quality of a cascade classifier is given by accuracy and throughput (i.e., system costs) associated therewith. In one embodiment, accuracy refers to the fraction of labels produced by M that are correct. Incorrect labels result in incorrect entries in a notional relation of the model. As used herein, throughput is the number of classifications per unit time, such as frames per second (fps) and, in general, directly correlates with system costs of a particular cascade. Furthermore, throughput measures how fast a relation of the model is populated. As such, for a given set of classifiers the classifier system 100 can find a subset of classifiers that are Pareto optimal over the accuracy and throughput. That is, there is a subset of classifiers within the classifiers 160 that is non-dominated in terms of accuracy and throughput. This subset forms the Pareto frontier and can be selected as the subset and provided for additional selection according to desired tradeoffs.

Figure 3:
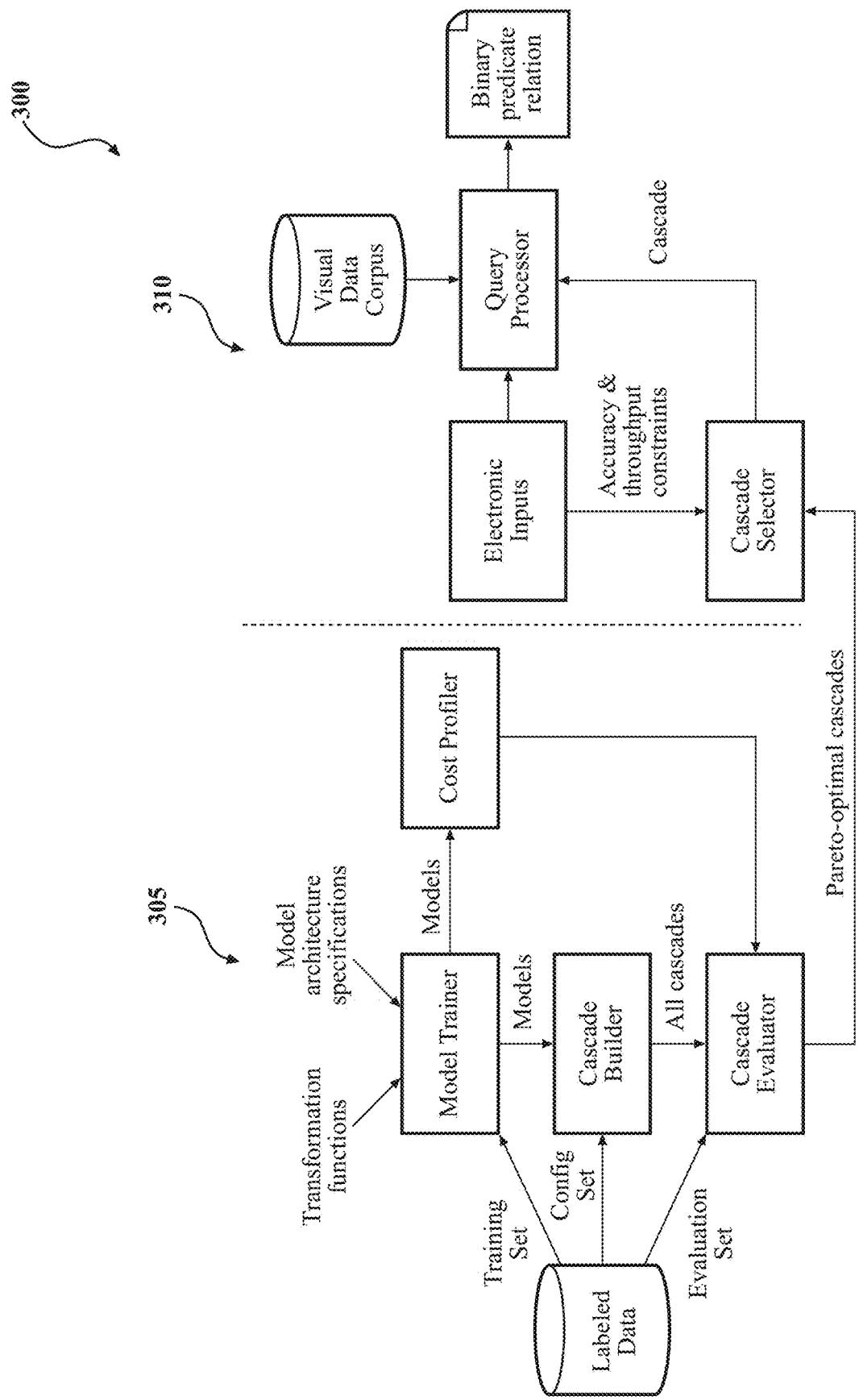
FIG. 3 illustrates another embodiment of a system associated with generating a set of cascade classifiers and assessing the set to identify at least one query classifier.

Accordingly, with reference to FIG. 3, an additional system architecture 300 of the classifier system 100 is illustrated. The system architecture illustrates both a system initialization configuration 305 and a query configuration 310. The system initialization configuration 305 includes a repository of models that are trained according to a labeled data set. In one embodiment, the labeled data set is relatively small compared to what is generally used to train deep CNNs. For example, the labeled data set can include, in one embodiment, 3,000-4,000 labeled images, split into positive and negative examples.

Moreover, in one embodiment, the labeled data is split into three sets, a training data set, a configuration data set, and an evaluation data set as illustrated in FIG. 3. The training set $I_{train}$ is provided to the model trainer, along with the input transformation functions F (i.e., transformation modules) and the model architecture specifications A. In one embodiment, the system 300 trains a set of models M and provides the trained models M to both a cost profiler and a cascade builder (e.g., cascade module 130). As provided in relation to the architecture 300, the cost profiler measures the throughput (i.e., system costs) of each model in relation to the attributes of the defined computing system. Furthermore, the cascade builder constructs the set of cascades C 160, using M and the configuration set $I_{config}$. Using the evaluation set $I_{eval}$, the cascade evaluator measures accuracy and throughput (using results of the cost profiler) for the cascades C 160.

Accordingly, the cascade module 130 can determine the subset of cascades by which are Pareto optimal cascades from the evaluation of the set 160. Thereafter, in one embodiment, at query time, the query module 140 receives an electronic input identifying desired constraints on accuracy and throughput. From the identified constraints, which generally represent desired aspects of how the query classifier is to function in relation to tradeoffs between throughput and accuracy, the cascade selector (i.e., query module 140) chooses which of the Pareto optimal cascades best suits the identified constraints. The selected cascade is the query classifier which the query processor (e.g., processor 110 executing the query module 140) executes to process the data in the visual data corpus. The query classifier extracts the notional relation for the binary predicate in the provided query in satisfaction thereof.

Figure 4:
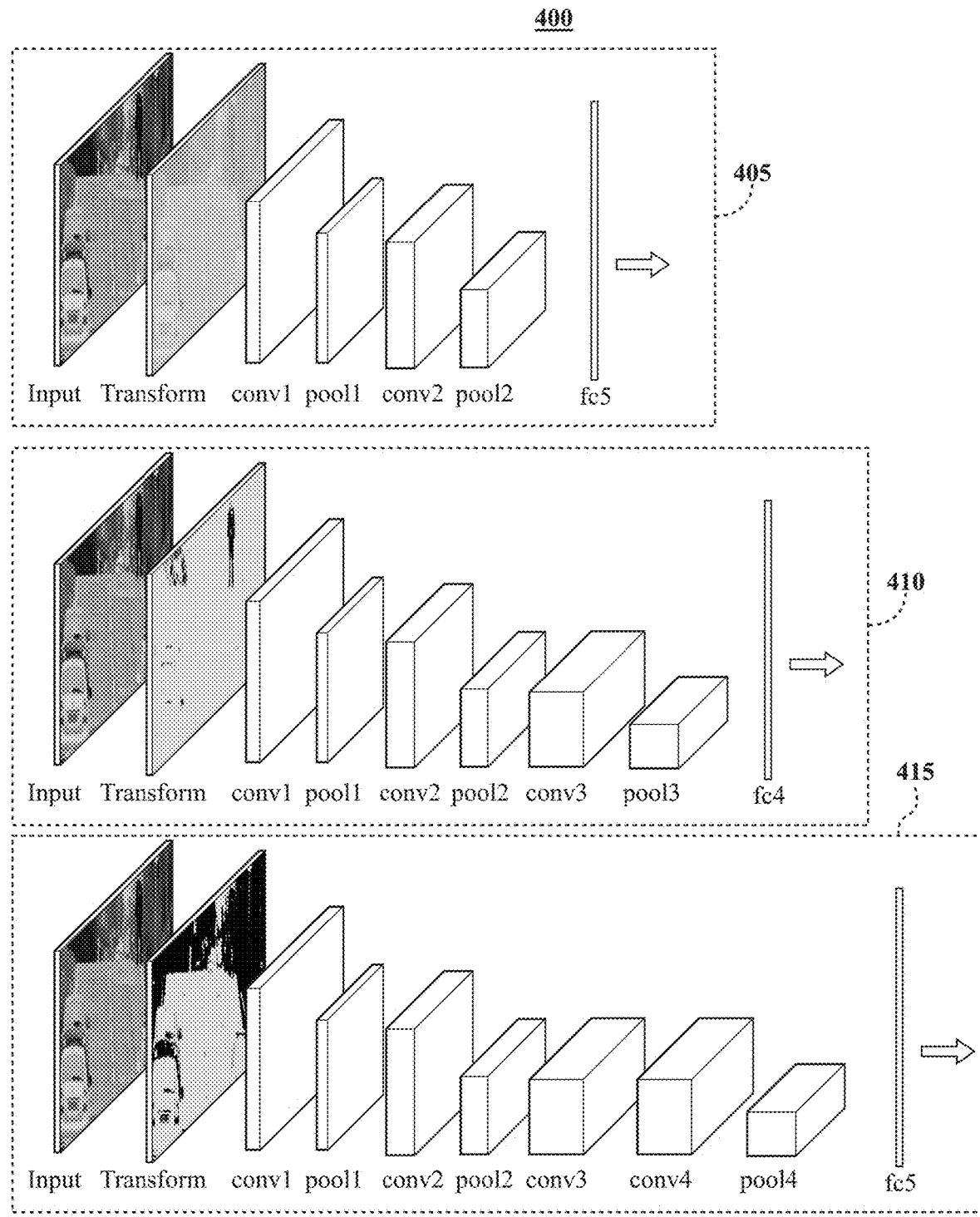
FIG. 4 illustrates one example of an architecture of a cascade classifier as embodied herein.

FIG. 4 provides an example architecture of a cascade classifier 400 of the set of cascade classifiers 160. As illustrated, the classifier 400 is comprised of three separate levels of classifier pairs 405, 410, and 415. Furthermore, each of the classifier pairs 405, 410, and 415 include a variation of a convolutional neural network (CNN). In general, each of the pairs 405, 410, and 415 include a transform that corresponds to one of the transform modules as previously discussed. As illustrated, each of the transforms provide different pre-processing of the input image, but may provide the same or similar pre-processing in various combinations. The set of input transformation functions F comprises functions that perform one or more image processing operations, such as image resolution scaling and color channel modifications. These types of transformations are especially useful in relation to building fast, small models: reducing image size and color depth can, for example, greatly reduce the number of model input values, which directly reduces the size of tensor operations within the CNN.

Accordingly, the transformation modules accept inputs of images that are still images or frames from a video, execute the pre-processing on the input and then pass the transformed input to layers of convolutional nodes that from the CNN. In one configuration, each convolutional layer is followed by a max pooling layer, connected by, in one or more embodiments, rectified linear activations (ReLu). The final convolutional layer feeds into a fully-connected ReLu layer (e.g., fc3, fc4, fc5). Furthermore, the classifier pairs 405, 410, and 415 can include a single sigmoid output node that provides an inferred label as output in response to aspects of a query and the input. As a general matter, in one aspect, the provided CNNs are relatively small to reduce overall runtimes, having, for example, one to four convolutional layers.

Therefore, the design space defined by the classifier pairs including the noted model architecture variations and input transformation functions result in, for example, hundreds of different configurations for the classifier pairs. Once each CNN is trained on a labeled subset of I images, the cascade module 130 composes the classifier pairs into cascades. In either case, the general functioning of the cascades initiates with a first pair such as the classifier pair 405 processing the input according to a provided query. The input may progress to subsequent classifier pairs 410 and so on if the classifier pair 405 is uncertain of whether the queried predicate is present in the input image. In this way, successively more complex classifier pairs (e.g., 410, and 415) can analyze the input in an attempt to resolve content included therein without using a complex classifier pair with longer runtimes for all inputs.

Figure 5:
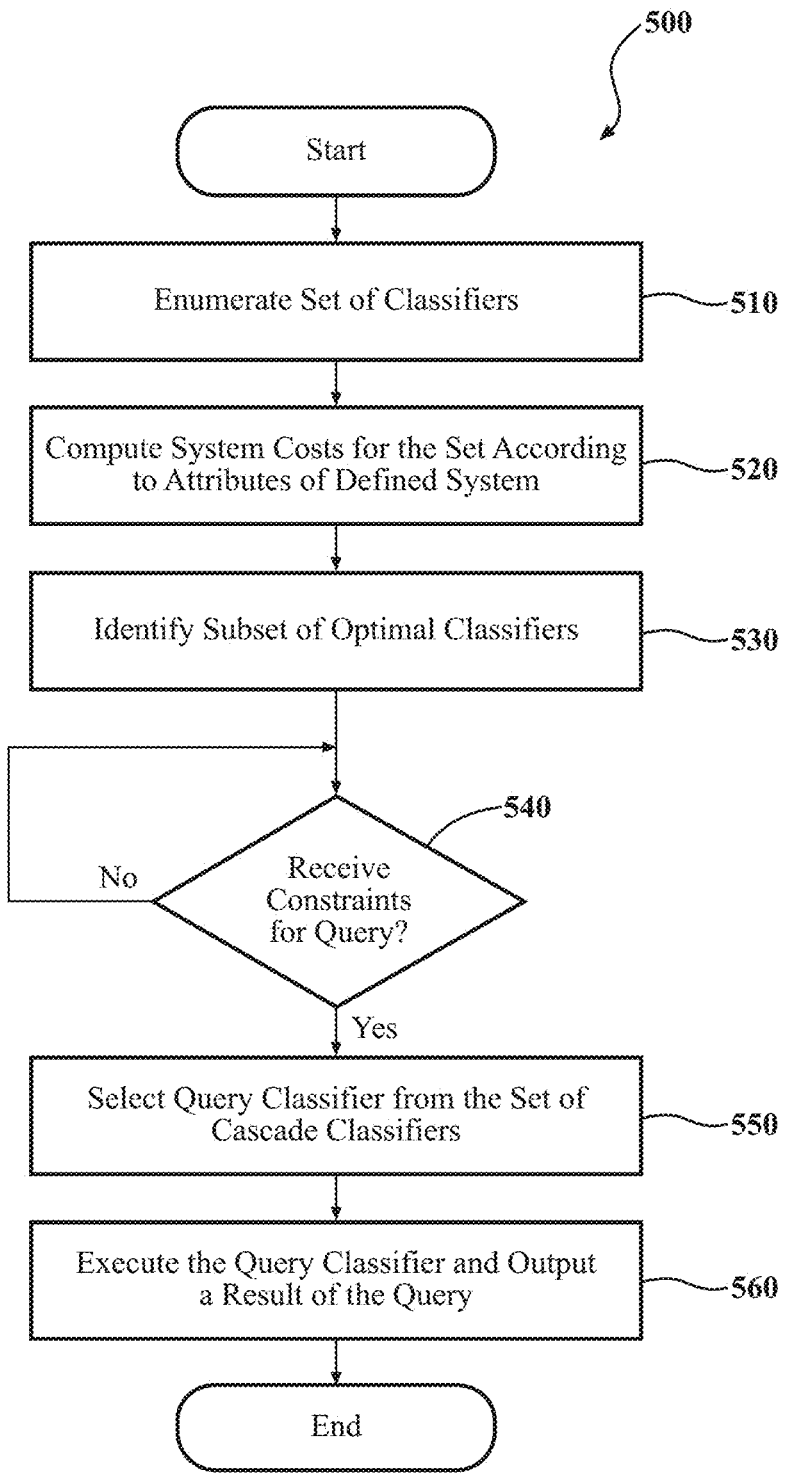
FIG. 5 illustrates one embodiment of a method associated with implementing a cost-aware cascade classifier.

Additional aspects of improving querying of a visual dataset will be discussed in relation to FIG. 5. FIG. 5 illustrates a flowchart of a method 500 that is associated with implementing system-aware cascade classifiers. Method 500 will be discussed from the perspective of the classifier system 100 of FIG. 1. While method 500 is discussed in combination with the classifier system 100, it should be understood that the method 500 is not limited to being implemented within the classifier system 100, but is instead one example of a system that may implement the method 500.

At 510, the cascade module 130 enumerates a set of cascade classifiers 160. As previously discussed, the cascade classifiers 160 include a plurality of separate classifiers that are each separately comprised of different combinations of transformation modules and machine learning modules arranged in multiple pairs. Moreover, the cascade classifiers 160 are generally implemented to process non-textual data such as images, point cloud data, and so on. The images may be still images, frames from a video, near-infrared images, or, more generally, any information depicted in a visual format.

Accordingly, at 510, the cascade module 130 enumerates the cascade classifiers 160 by identifying and/or generating the transformation modules, generating variations of a machine learning algorithm according to different architecture parameters in order to populate the machine learning modules, pairing the transformation modules with the machine learning modules into classifier pairs, training the classifier pairs using a training data set (i.e., labeled dataset), and pairing multiples of the classifier pairs to generate the separate cascade classifiers. Moreover, in further embodiments, the cascade module 130 also determines further aspects of the cascade classifiers 160 and configures the cascade classifiers 160 accordingly. For example, the cascade module 130 can generate the decision thresholds $p_{low}$, $p_{high}$. As previously indicated, the decision thresholds indicate when an output from a cascade is characterized as a sufficiently accurate determination or an uncertain determination, in which case processing may proceed to a subsequent classifier in a cascade. Thus, the cascade module 130 can selectively adjust the decision thresholds to provide tradeoffs between accuracy and throughput.

In further aspects, the cascade module 130, at 510, indexes/lists and/or stores the generated cascade classifiers in a local memory so that subsequent processes can separately reference classifiers in the set 160. In this way, the set of cascade classifiers is generated to include cascades having a range of different architectures between different classifiers therein and thus to have different characteristics in relation to how the cascades function on a given computing system.

At 520, the cascade module 130 computes the system costs 170 for individual ones of the set of cascade classifiers 160. In one embodiment, the cascade module 130 computes the system costs 170 according to attributes of a defined computing system on which one or more of the cascade classifiers 160 is to be implemented. That is, the cascade module 130 receives electronic information indicating specifications of the defined computing system in order to assess how the cascade classifiers 160 will likely function thereon. For example, the attributes can include information indicating throughput (e.g., data bandwidth and latencies) of a data pipeline, processing capabilities (e.g., processor speeds, brands, number of processors, etc.), and other aspects that generally define how the computing system is likely to function when executing the cascade classifiers 160.

In one approach, the cascade module 130 separately tests the machine learning modules using an evaluation dataset and within, for example, a test environment that mimics the attributes of the defined computing system. Accordingly, the cascade module 130 can quantify system costs associated with the separate machine learning modules to characterize associated throughputs. The cascade module 130 can then use this information in combination with system costs for the transformation modules and system costs associated with loading of data to characterize an overall system cost of each of the cascade classifiers 160. In this way, the cascade module 130 accounts for data handling costs within the system costs such that the system costs reflect actual throughputs for the defined computing system instead of naïve costs associated with executing the machine learning modules without regard to loading and transforming images.

At 530, the cascade module 130 identifies a subset of the set of cascade classifiers 160 that are Pareto optimal classifiers. As previously defined, the Pareto optimal classifiers are those classifiers in the set of cascade classifiers 160 that exhibit dominant characteristics over other classifiers in relation to the system costs and accuracy. In essence, the Pareto optimal classifiers have better throughput at a given accuracy than other classifiers. Thus, the cascade module 130 can identify the subset, and segment the subset or otherwise annotate the subset as the Pareto optimal classifiers to distinguish the subset within the cascade classifiers 160.

In further aspects, the subset of classifiers can be provided to the computing device within which the subset is to be implemented such that the subset is stored in a local memory thereof. For example, the subset can be installed within a solid-state memory device of a vehicle that includes autonomous functionality. Thus, the autonomous vehicle may implement the subset to analyze video from an onboard camera 190 so that the vehicle can recognize objects within the video. In either case, the subset of cascade classifiers are optimized for the defined computing system to execute in an efficient manner.

At 540, the query module 140 monitors for an electronic input requesting a query over a data set (e.g., image data 180). The electronic input, in one embodiment, specifies system constraints that define threshold values for accuracy and throughput associated with executing a classifier to generate content as an electronic output. Thus, in an instance when the subset includes more than one cascade classifier, the query module 140 can use the system constraints to select a query classifier therefrom as discussed at 550. In either case, the electronic input includes further information such as a data source (i.e., the image data 180) that is to be queried along with a predicate indicating content that is desired as an output. Furthermore, the electronic input itself, can be provided by a computer process that is functioning to autonomously control a vehicle, automatically analyze images for purposes of recognizing content therein, through an input mechanism by which a user manually specifies the noted information, and so on.

At 550, the query module 140 selects one of the cascades within the subset as the query classifier. In one embodiment, the query module 140 selects the query classifier according to the system constraints as previously described. That is, the query module 140 determines which of cascades in the subset corresponds with the system constraints in order to provide the query classifier as the classifier that, for example, best satisfies the noted constraints. For example, the system constraints may indicate that accuracy is to be above a certain threshold and that throughput is to be within a particular range. In such a case, the query module 140 can select one of the classifiers in the subset that best fits the noted constraints. In this way, the classifier that is implemented to perform the query can be dynamically selected according to changing conditions and thus can better accommodate a variety of different circumstances.

At 560, the query module 140 executes the query using the query classifier and provides an electronic output indicating whether the queried content is present. In one embodiment, the query module 140 executes the query classifier over the image data 180 to identify content within the images. The query module 140, in one embodiment, provides the electronic output as a label indicating the image within which the queried content occurs. In further aspects, the query module 140 provides a segmented portion of a particular image including the queried content or simply provides a whole image that includes the content. Moreover, while a single result for the electronic output is discussed in further aspects the electronic output includes a plurality of labels, images, or another form of output but, in either case, includes more than a single result. In this way, the method 500 improves the implementation of a cascade classifier by considering system costs associated with particular operating conditions of a defined system while also providing flexibility in producing a subset of optimal classifiers for a range of operation conditions.

Figure 6:
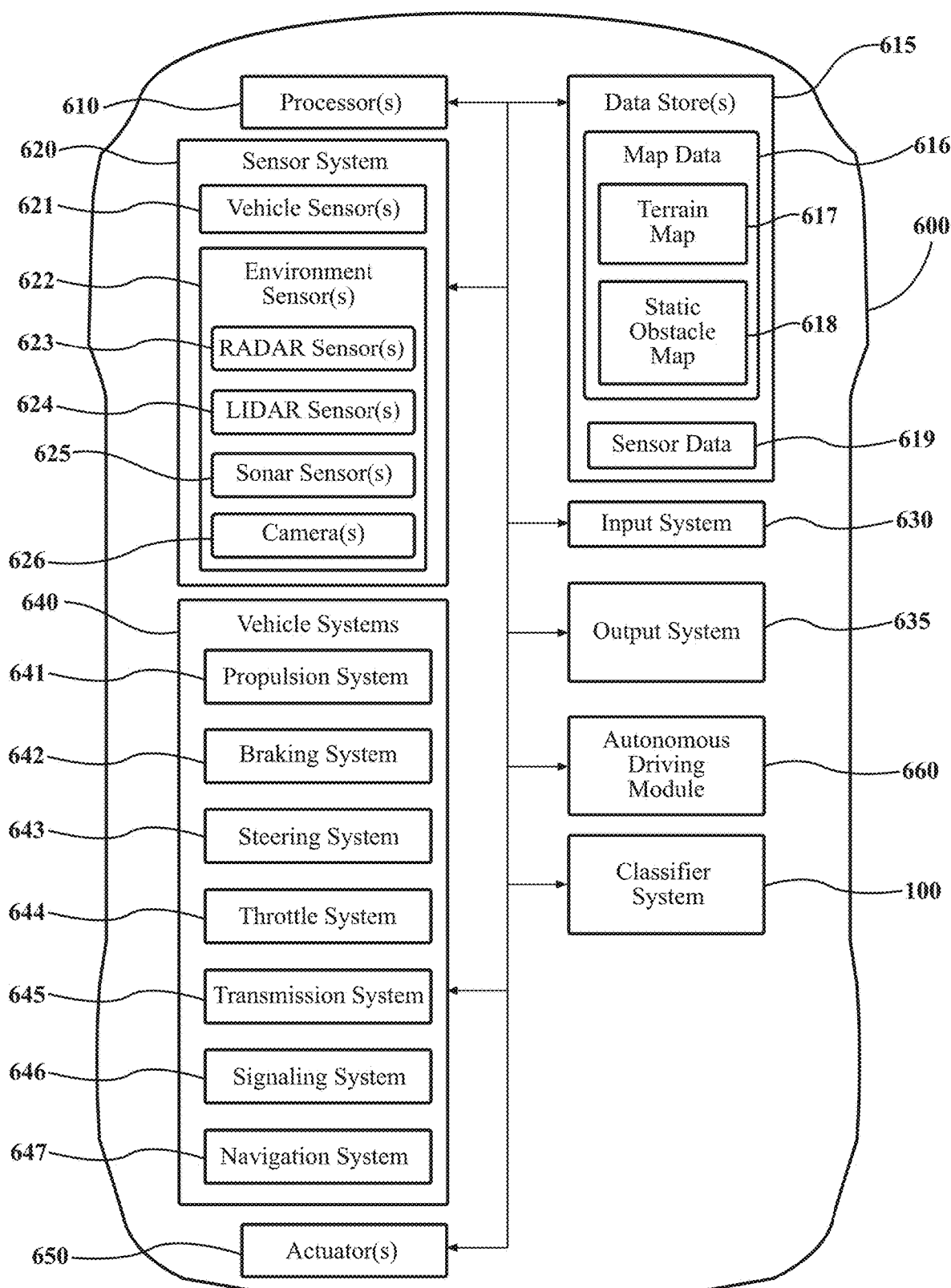
FIG. 6 illustrates one embodiment of a vehicle within which systems and methods disclosed herein may be implemented.

As an additional example of an implementation of at least a portion of the classifier system 100, an example vehicle 600 will now be discussed in relation to FIG. 6. FIG. 6 represents an example environment within which the system and methods disclosed herein may operate. In some instances, the vehicle 600 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 600 can be a conventional vehicle that is configured to operate in only a manual mode.

In one or more embodiments, the vehicle 600 is an autonomous vehicle. As used herein, "autonomous vehicle" refers to a vehicle that operates in an autonomous mode to self-drive without control inputs from a human driver. "Autonomous mode" refers to navigating and/or maneuvering the vehicle 600 along a travel route using one or more computing systems to control the vehicle 600 with minimal or no input from a human driver. In one or more embodiments, the vehicle 600 is highly automated or completely automated. In one embodiment, the vehicle 600 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 600 along a travel route.

The vehicle 600 can include one or more processors 610. In one or more arrangements, the processor(s) 610 can be a main processor of the vehicle 600. For instance, the processor(s) 610 can be an electronic control unit (ECU). The vehicle 600 can include one or more data stores 615 for storing one or more types of data. The data stores 615 can include volatile and/or non-volatile memory. Examples of suitable data stores 615 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 615 can be a component of the processor(s) 610, or the data store 615 can be operatively connected to the processor(s) 610 for use thereby. The term "operatively connected," as used throughout this description, can include direct or indirect connections, including connections without direct physical contact.

In one or more arrangements, the one or more data stores 615 can include map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The terrain maps 617 can include information about the ground, terrain, roads, surfaces, and/or other features of one or more geographic areas. The terrain maps 617 can include elevation data in the one or more geographic areas. The map data 616 can be high quality and/or highly detailed. The terrain maps 617 can define one or more ground surfaces, which can include paved roads, unpaved roads, land, and other things that define a ground surface.

In one or more arrangements, the map data 616 can include one or more static obstacle maps 618. The static obstacle map(s) 618 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 618 can have location data, size data, dimension data, material data, and/or other data associated with it. The static obstacle map(s) 618 can include measurements, dimensions, distances, and/or information for one or more static obstacles. The static obstacle map(s) 618 can be high quality and/or highly detailed. The static obstacle map(s) 618 can be updated to reflect changes within a mapped area.

The one or more data stores 615 can include sensor data 619. In this context, "sensor data" means any information about the sensors that the vehicle 600 is equipped with, including the capabilities and other information about such sensors. As will be explained below, the vehicle 600 can include the sensor system 620. The sensor data 619 can relate to one or more sensors of the sensor system 620. As an example, in one or more arrangements, the sensor data 619 can include information on one or more LIDAR sensors 624 of the sensor system 620.

In some instances, at least a portion of the map data 616 and/or the sensor data 619 can be located in one or more data stores 615 located onboard the vehicle 600. Alternatively, or in addition, at least a portion of the map data 616 and/or the sensor data 619 can be located in one or more data stores 615 that are located remotely from the vehicle 600.

As noted above, the vehicle 600 can include the sensor system 620. The sensor system 620 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 620 includes a plurality of sensors, the sensors can work independently from each other. Alternatively, two or more of the sensors can work in combination with each other. In such case, the two or more sensors can form a sensor network. The sensor system 620 and/or the one or more sensors can be operatively connected to the processor(s) 610, the data store(s) 615, and/or another element of the vehicle 600 (including any of the elements shown in FIG. 6). The sensor system 620 can acquire data of at least a portion of the external environment of the vehicle 600.

The sensor system 620 can include any suitable type of sensor. Various examples of different types of sensors will be described herein. However, it will be understood that the embodiments are not limited to the particular sensors described. The sensor system 620 can include one or more vehicle sensors 621. The vehicle sensors 621 can detect, determine, and/or sense information about the vehicle 600 itself. In one or more arrangements, the vehicle sensors 621 can be configured to detect, and/or sense position and orientation changes of the vehicle 600, such as, for example, based on inertial acceleration. In one or more arrangements, the vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The vehicle sensors 621 can be configured to detect, and/or sense one or more characteristics of the vehicle 600. In one or more arrangements, the vehicle sensors 621 can include a speedometer to determine a current speed of the vehicle 600.

Alternatively, or in addition, the sensor system 620 can include one or more environment sensors 622 configured to acquire, and/or sense driving environment data. "Driving environment data" includes data or information about the external environment in which an autonomous vehicle is located or one or more portions thereof. For example, the one or more environment sensors 622 can be configured to detect, quantify and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify and/or sense other things in the external environment of the vehicle 600, such as, for example, lane markers, signs, traffic lights, traffic signs, lane lines, crosswalks, curbs proximate the vehicle 600, off-road objects, etc.

Various examples of sensors of the sensor system 620 will be described herein. The example sensors may be part of the one or more environment sensors 622 and/or the one or more vehicle sensors 621. However, it will be understood that the embodiments are not limited to the particular sensors described. As an example, in one or more arrangements, the sensor system 620 can include one or more radar sensors 623, one or more LIDAR sensors 624, one or more sonar sensors 625, and/or one or more cameras 626. In one or more arrangements, the one or more cameras 626 can be high dynamic range (HDR) cameras or infrared (IR) cameras.

The vehicle 600 can include an input system 630. An "input system" includes any device, component, system, element or arrangement or groups thereof that enable information/data to be entered into a machine. The input system 630 can receive an input from a vehicle passenger (e.g., a driver or a passenger). The vehicle 600 can include an output system 635. An "output system" includes any device, component, or arrangement or groups thereof that enable information/data to be presented to a vehicle passenger (e.g., a person, a vehicle passenger, etc.).

The vehicle 600 can include one or more vehicle systems 640. Various examples of the one or more vehicle systems 640 are shown in FIG. 6. However, the vehicle 600 can include more, fewer, or different vehicle systems. It should be appreciated that although particular vehicle systems are separately defined, each or any of the systems or portions thereof may be otherwise combined or segregated via hardware and/or software within the vehicle 600. The vehicle 600 can include a propulsion system 641, a braking system 642, a steering system 643, throttle system 644, a transmission system 645, a signaling system 646, and/or a navigation system 647. Each of these systems can include one or more devices, components, and/or combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system or a geolocation system.

The processor(s) 610 (and/or processor 110), the classifier system 100, and/or the autonomous driving module(s) 660 can be operatively connected to communicate with the various vehicle systems 640 and/or individual components thereof. For example, returning to FIG. 6, the processor(s) 610 and/or the autonomous driving module(s) 660 can be in communication to send and/or receive information from the various vehicle systems 640 to control the movement, speed, maneuvering, heading, direction, etc. of the vehicle 600. The processor(s) 110, the classifier system 100, and/or the autonomous driving module(s) 660 may control some or all of these vehicle systems 640 and, thus, may be partially or fully autonomous.

The processor(s) 110, the classifier system 100, and/or the autonomous driving module(s) 660 can be operatively connected to communicate with the various vehicle systems 640 and/or individual components thereof. For example, returning to FIG. 6, the processor(s) 610, the classifier system 100, and/or the autonomous driving module(s) 660 can be in communication to send and/or receive information from the various vehicle systems 640 to control the movement, speed, maneuvering, heading, direction, etc. of the vehicle 600. The processor(s) 110, the classifier system 100, and/or the autonomous driving module(s) 660 may control some or all of these vehicle systems 640. For example, the processor 610, in one embodiment, controls the camera 126 to acquire images of an area surrounding the vehicle, which are then provided to the classifier system 100 to extract content about the environment so that the autonomous driving module 660 can make determinations about how to control the vehicle 600.

The processor(s) 610, the classifier system 100, and/or the autonomous driving module(s) 660 may be operable to control the navigation and/or maneuvering of the vehicle 600 by controlling one or more of the vehicle systems 640 and/or components thereof. For instance, when operating in an autonomous mode, the processor(s) 610, the classifier system 100, and/or the autonomous driving module(s) 660 can control the direction and/or speed of the vehicle 600. The processor(s) 610, the classifier system 100, and/or the autonomous driving module(s) 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 600 can include one or more actuators 650. The actuators 650 can be any element or combination of elements operable to modify, adjust and/or alter one or more of the vehicle systems 640 or components thereof to responsive to receiving signals or other inputs from the processor(s) 610 and/or the autonomous driving module(s) 660. Any suitable actuator can be used. For instance, the one or more actuators 150 can include motors, pneumatic actuators, hydraulic pistons, relays, solenoids, and/or piezoelectric actuators, just to name a few possibilities.

The vehicle 600 can include one or more modules, at least some of which are described herein. The modules can be implemented as computer-readable program code that, when executed by a processor 610, implement one or more of the various processes described herein. One or more of the modules can be a component of the processor(s) 610, or one or more of the modules can be executed on and/or distributed among other processing systems to which the processor(s) 610 is operatively connected. The modules can include instructions (e.g., program logic) executable by one or more processor(s) 610. Alternatively, or in addition, one or more data store 615 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more autonomous driving modules 660. The autonomous driving module(s) 660 can be configured to receive data from the sensor system 620 and/or any other type of system capable of capturing information relating to the vehicle 600 and/or the external environment of the vehicle 600. In one or more arrangements, the autonomous driving module(s) 660 can use such data to generate one or more driving scene models. The autonomous driving module(s) 660 can determine position and velocity of the vehicle 600. The autonomous driving module(s) 660 can determine the location of obstacles, objects, or other environmental features including traffic signs, trees, shrubs, neighboring vehicles, pedestrians, etc.

The autonomous driving module(s) 660 can be configured to receive, and/or determine location information for obstacles within the external environment of the vehicle 600 for use by the processor(s) 610, and/or one or more of the modules 660 described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The autonomous driving modules 660 either independently or in combination can be configured to determine travel path(s), current autonomous driving maneuvers for the vehicle 600, future autonomous driving maneuvers and/or modifications to current autonomous driving maneuvers based on data acquired by the sensor system 620, driving scene models, and/or data from any other suitable source such as determinations from the sensor data 250 as implemented by the query module 640. "Driving maneuver" means one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The autonomous driving module(s) 660 can be configured to implement determined driving maneuvers. The autonomous driving module(s) 660 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 660 can be configured to execute various vehicle functions and/or to transmit data to, receive data from, interact with, and/or control the vehicle 600 or one or more systems thereof (e.g. one or more of vehicle systems 640).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A classifier system for improving querying of a visual dataset of images through implementing system-aware cascades, comprising:
    one or more processors;
    a memory communicably coupled to the one or more processors and storing:
    a cascade module including instructions that when executed by the one or more processors cause the one or more processors to enumerate a set of cascade classifiers that are each separately comprised of transformation modules and machine learning modules arranged in multiple pairs, wherein classifiers of the set of cascade classifiers are configured to extract content from an image according to a query; and
    a query module including instructions that when executed by the one or more processors cause the one or more processors to select a query classifier from the set of cascade classifiers based, at least in part, on system costs that characterize computational resources consumed by the classifiers of the set of cascade classifiers, wherein the computational resources include at least data handling costs associated with loading times for loading the image from a memory when executing the query and pre-processing the image according to the transformation modules, and execution costs for processing the image according to the machine learning modules, and
    wherein the query module includes instructions to identify content within the image using the query classifier.

2. The classifier system of claim 1, wherein the cascade module includes instructions to compute the system costs for executing individual ones of the set of cascade classifiers according to at least attributes of a defined computing system, wherein the attributes include at least a throughput of a data pipeline, and processing capabilities, and
    wherein the data handling costs indicate the loading times for the memory according to a type of the memory and a transform cost for preparing the image for the machine learning modules to account for latencies associated with handling the image prior to processing.

3. The classifier system of claim 1, wherein the cascade module includes instructions to generate the set of cascade classifiers including instructions to pair respective ones of the transformation modules with respective ones of the machine learning modules to generate classifier pairs such that respective cascade classifiers of the set of the cascade classifiers include a plurality of the classifier pairs, and
    wherein the cascade module includes instructions to generate the set of cascade classifiers including instructions to populate the respective cascade classifiers of the set of the cascade classifiers with different combinations of the classifier pairs according to a configuration that specifies classifier pairs of a cascade classifier are of successively increasing accuracy for identifying the content.

4. The classifier system of claim 3, wherein the machine learning modules include convolutional neural networks with a range of different architectures for which the system costs vary, and
    wherein the transformation modules include image processing techniques for transforming the image prior to the image being analyzed by the machine learning modules of the classifier pairs and for which the system costs vary.

5. The classifier system of claim 4, wherein the different architectures of the machine learning modules include differing numbers of layers within respective ones of the machine learning modules, wherein the image processing techniques include image filters to modify one or more of a resolution and a color of the image, and wherein the cascade module includes instructions to generate the set of cascade classifiers including instructions to generate the classifier pairs by executing a cross product between the transformation modules and the machine learning modules to populate the classifier pairs with different combinations of the transformation modules and the machine learning modules.

6. The classifier system of claim 1, wherein the query module includes instructions to select the query classifier from the set of cascade classifiers including instructions to select the query classifier from a subset of the set of cascade classifiers that are Pareto optimal classifiers, and wherein the Pareto optimal classifiers are members of the set of cascade classifiers that exhibit dominant characteristics in relation to the system costs and accuracy across the set of cascade classifiers.

7. The classifier system of claim 6, wherein the query module includes instructions to select the query classifier includes instructions to receive system constraints and identify the query classifier from the subset according to the system constraints, and wherein the system constraints define threshold values for accuracy and throughput associated with executing the query classifier to generate the content as an electronic output.

8. The classifier system of claim 1, wherein the visual dataset of the images is a video library, wherein the images are frames within videos in the visual dataset, and wherein the query module includes instructions to extract the images from the videos for querying by the query classifier.

9. A non-transitory computer-readable medium for improving querying of a visual dataset of images through implementing system-aware cascades and including instructions that when executed by one or more processors cause the one or more processors to:

enumerate a set of cascade classifiers that are each separately comprised of transformation modules and machine learning modules arranged in multiple pairs, wherein classifiers of the set of cascade classifiers are configured to extract content from an image according to a query;

select a query classifier from the set of cascade classifiers based, at least in part, on system costs that characterize computational resources consumed by the classifiers of the set of cascade classifiers, wherein the computational resources include at least data handling costs associated with loading times for loading the image from a memory when executing the query and preprocessing the image according to the transformation modules, and execution costs for processing the image according to the machine learning modules; and identify content within the image using the query classifier.

10. The non-transitory computer-readable medium of claim 9, wherein the instructions to compute the system costs for executing individual ones of the set of cascade classifiers according to at least attributes of a defined computing system, wherein the attributes include at least a throughput of a data pipeline, and processing capabilities, and wherein the data handling costs indicate the loading times for the memory according to a type of the memory and a transform cost for preparing the image for the machine learning modules to account for latencies associated with handling the image prior to processing.

11. The non-transitory computer-readable medium of claim 9, wherein the instructions to generate the set of cascade classifiers include instructions to pair respective ones of the transformation modules with respective ones of the machine learning modules to generate classifier pairs such that respective cascade classifiers of the set of the cascade classifiers include a plurality of the classifier pairs, and wherein the instructions to generate the set of cascade classifiers include instructions to populate the respective cascade classifiers of the set of the cascade classifiers with different combinations of the classifier pairs according to a configuration that specifies classifier pairs of a cascade classifier are of successively increasing accuracy for identifying the content.

12. The non-transitory computer-readable medium of claim 11, wherein the machine learning modules include convolutional neural networks with a range of different architectures for which the system costs vary, and wherein the transformation modules include image processing techniques for transforming the image prior to the image being analyzed by the machine learning modules of the classifier pairs and for which the system costs vary.

13. The non-transitory computer-readable medium of claim 9, wherein the instructions to select the query classifier from the set of cascade classifiers include instructions to select the query classifier from a subset of the set of cascade classifiers that are Pareto optimal classifiers, and wherein the Pareto optimal classifiers are members of the set of cascade classifiers that exhibit dominant characteristics in relation to the system costs and accuracy across the set of cascade classifiers.

14. A method for improving querying of a visual dataset of images through implementing system-aware cascades, the method comprising:

enumerating, by a processor, a set of cascade classifiers that are each separately comprised of transformation modules and machine learning modules arranged in multiple pairs, wherein classifiers of the set of cascade classifiers are configured to extract content from an image according to a query;

selecting, by the processor, a query classifier from the set of cascade classifiers based, at least in part, on system costs that characterize computational resources consumed by the classifiers of the set of cascade classifiers, wherein the computational resources include at least data handling costs associated with loading times for loading the image from a memory when executing the query and pre-processing the image according to the transformation modules, and execution costs for processing the image according to the machine learning modules; and identifying, by the processor, content within the image using the query classifier.

15. The method of claim 14, further comprising:

computing the system costs for executing individual ones of the set of cascade classifiers according to at least attributes of a defined computing system, wherein the attributes include at least a throughput of a data pipeline, and processing capabilities, and wherein the data handling costs indicate the loading times for the memory according to a type of the memory and a transform cost for preparing the image for the machine learning modules to account for latencies associated with handling the image prior to processing.

16. The method of claim 14, further comprising:

generating the set of cascade classifiers by pairing respective ones of the transformation modules with respective ones of the machine learning modules to generate classifier pairs such that respective cascade classifiers of the set of the cascade classifiers include a plurality of the classifier pairs, and wherein generating the set of cascade classifiers includes populating the respective cascade classifiers of the set of the cascade classifiers with different combinations of the classifier pairs according to a configuration that specifies classifier pairs of a cascade classifier are of successively increasing accuracy for identifying the content.

17. The method of claim 16, wherein the machine learning modules include convolutional neural networks with a range of different architectures for which the system costs vary, and wherein the transformation modules include image processing techniques for transforming the image prior to the image being analyzed by the machine learning modules of the classifier pairs and for which the system costs vary.

18. The method of claim 17, wherein the different architectures of the machine learning modules include differing numbers of layers within respective ones of the machine learning modules, wherein the image processing techniques include image filters to modify one or more of a resolution and a color of the image, and wherein generating the set of cascade classifiers includes generating the classifier pairs by executing a cross product between the transformation modules and the machine learning modules to populate the classifier pairs with different combinations of the transformation modules and the machine learning modules.

19. The method of claim 14, wherein selecting the query classifier from the set of cascade classifiers includes selecting the query classifier from a subset of the set of cascade classifiers that are Pareto optimal classifiers, and wherein the Pareto optimal classifiers are members of the set of cascade classifiers that exhibit dominant characteristics in relation to the system costs and accuracy across the set of cascade classifiers.

20. The method of claim 19, wherein selecting the query classifier includes receiving system constraints and identifying the query classifier from the subset according to the system constraints, and wherein the system constraints define threshold values for accuracy and throughput associated with executing the query classifier to generate the content as an electronic output.

* * * * *